United States Patent
Zhang et al.

(10) Patent No.: US 11,037,025 B2
(45) Date of Patent: Jun. 15, 2021

(54) SYSTEMS AND METHODS FOR ADVERSARIALLY ROBUST OBJECT DETECTION

(71) Applicant: Baidu USA, LLC, Sunnyvale, CA (US)

(72) Inventors: Haichao Zhang, Sunnyvale, CA (US); Jianyu Wang, Santa Clara, CA (US)

(73) Assignee: Baidu USA LLC, Sunnyvale, CA (US)

( * ) Notice: Subject to any disclaimer, the term of this patent is extended or adjusted under 35 U.S.C. 154(b) by 68 days.

(21) Appl. No.: 16/427,233

(22) Filed: May 30, 2019

(65) Prior Publication Data

US 2020/0380300 A1    Dec. 3, 2020

(51) Int. Cl.
    *G06K 9/62*      (2006.01)
    *G06K 9/00*      (2006.01)

(52) U.S. Cl.
    CPC ....... *G06K 9/6256* (2013.01); *G06K 9/00805* (2013.01); *G06K 9/6264* (2013.01); *G06K 9/6269* (2013.01)

(58) Field of Classification Search
None
See application file for complete search history.

(56) References Cited

U.S. PATENT DOCUMENTS

| | | | |
|---|---|---|---|
| 2018/0253866 A1* | 9/2018 | Jain | G06N 7/005 |
| 2019/0073560 A1* | 3/2019 | Matei | G06K 9/4628 |
| 2019/0130110 A1* | 5/2019 | Lee | G06N 5/041 |
| 2019/0295302 A1* | 9/2019 | Fu | G06N 3/0454 |
| 2020/0050879 A1* | 2/2020 | Zaman | G05D 1/0246 |
| 2020/0223434 A1* | 7/2020 | Campos Macias | G06N 3/04 |
| 2020/0242250 A1* | 7/2020 | Chen | G06F 21/577 |
| 2020/0242252 A1* | 7/2020 | Chen | G06N 3/0481 |
| 2020/0265271 A1* | 8/2020 | Zhang | G06K 9/6232 |

FOREIGN PATENT DOCUMENTS

EP      3582143 A1 * 12/2019      G06T 7/0012

OTHER PUBLICATIONS

Eykholt et al.,"Physical adversarial examples for object detectors," arXiv preprint arXiv:1807.07769, 2018. (10 pgs).
Felzenszwalb et al.,"Object detection with discriminatively trained partbased models," IEEE Trans. Pattern Anal. Mach. Intell., 32(9):1627-1645, 2010. (20pgs).
Fu et al.,"DSSD: Deconvolutional single shot detector," arXiv preprint arXiv:1701.06659, 2017. (11pgs).

(Continued)

*Primary Examiner* — Delomia L Gilliard
(74) *Attorney, Agent, or Firm* — North Weber & Baugh LLP

(57) ABSTRACT

Described herein are embodiments for an approach to improve the robustness of an object detector against adversarial attacks. Existing attacks for object detectors and the impacts of individual task component on model robustness are systematically analyzed from a multi-task view of object detection. In one or more embodiments, a multi-task learning perspective of object detection is introduced and an asymmetric role of task losses is identified. One or more embodiments of an adversarial training method for robust object detection are presented to leverage the multiple sources of attacks for improving the robustness of object detection models.

20 Claims, 10 Drawing Sheets

(56) References Cited

OTHER PUBLICATIONS

R. Girshick,"Fast R-CNN" In IEEE International Conference on Computer Vision, 2015. (9pgs).
Girshick et al.,"Rich feature hierarchies for accurate object detection and semantic segmentation," arXiv preprint arXiv:1311.2524, 2014. (21pgs).
Goodfellow et al.,"Explaining and harnessing adversarial examples," arXiv preprint arXiv:1 412.6572, 2015. (11pgs).
Guo et al.,"Countering adversarial images using input transformations," arXiv preprint arXiv:1711.00117, 2018. (12pgs).
He et al.,"Rethinking ImageNet pre-training," arXiv preprint arXiv:1811.08883, 2018. (10pgs).
He et al.,"Deep residual learning for image recognition," arXiv preprint arXiv:1512.03385, 2015. (12pgs).
Kendall et al.,"Multi-task learning using uncertainty to weigh losses for scene geometry and semantics," arXiv preprint arXiv: 1705.07115, 2018. ( 14pgs).
Kurakin et al.,"Adversarial machine learning at scale," arXiv preprint arXiv:1611.01236, 2017. (17pgs).
Li et al.,"Attacking object detectors via imperceptible patches on background," arXiv preprint arXiv:1809.05966, 2018. (8pgs).
Li et al.,"Robust adversarial perturbation on deep proposal-based models," arXiv preprint arXiv:1809.05962, 2018. (12pgs).
Li et al.,"FSSD: feature fusion single shot multibox detector," arXiv preprint arXiv:1712.00960, 2018. (10pgs).
Liao et al.,"Defense against adversarial attacks using high-level representation guided denoiser," In IEEE Conference on Computer Vision and Pattern Recognition, 2018.(6pgs).
Lin et al.,"Focal loss for dense object detection," arXiv preprint arXiv:1708.02002, 2018. (10 pgs).
Lin et al.,"Microsoft COCO: Common objects in context," arXiv preprint arXiv:1405.0312, 2015. (15pgs).
Liu et al.,"Receptive field block net for accurate and fast object detection," arXiv preprint arXiv:1711.07767, 2018. (16pgs).
Liu et al.,"SSD: Single shot multibox detector," arXiv preprint arXiv:1512.02325, 2016. (17pgs).
Liu et al.,"Towards robust neural networks via random self-ensemble," arXiv preprint arXiv:1712.00673, 2018. (17pgs).
Athalye et al.,"Obfuscated gradients give a false sense of security: Circumventing defenses to adversarial examples," arXiv preprint arXiv:1802.00420, 2018. (12pgs).
Biggio et al.,"Wild patterns: Ten years after the rise of adversarial machine learning," arXiv preprint arXiv:1712.03141, 2018. (17pgs).
Cai et al.,"Cascade R-CNN: Delving into high quality object detection," arXiv preprint arXiv:1712.00726, 2017. (9pgs).
Carlini et al.,"Towards evaluating the robustness of neural networks," arXiv preprint arXiv:1608.04644, 2017. (19pgs).
R. Caruana,"Multitask learning. Machine Learning," 28(1):41-75, 1997. (35pgs).
Chen et al.,"ShapeShifter: Robust physical adversarial attack on Faster R-CNN object detector," arXiv preprint arXiv:1804.05810, 2019. (16pgs).
L. Cui,"MDSSD: Multi-scale deconvolutional single shot detector for small objects," arXiv preprint arXiv:1805.07009, 2018. (13pgs).
Dalal et al.,"Histograms of oriented gradients for human detection," In IEEE Conference on Computer Vision and Pattern Recognition, 2005. (8pgs).
Erhan et al., Scalable object detection using deep neural networks, arXiv preprint arXiv:1312.2249, 2013. (8pgs).
Everingham et al.,"The pascal visual object classes challenge: A retrospective," Int. J. Comput. Vision, 111(1):98-136, 2015. (8 pgs).
Tsipras et al.,"Robustness may be at odds with accuracy," arXiv preprint arXiv:1805.12152, 2018. (24pgs).

Tsoumakas et al.,"Multi label classification: An overview," 3(3):1-13, 2007. (18pgs).
Uijlings et al.,"Selective search for object recognition," International Journal of Computer Vision, 104(2):154-171, 2013. (14 pgs).
Viola et al.,"Robust real-time face detection," Int.J. Comput. Vision, 57 (2):137-154, 2004. (4 pgs).
Wei et al.,"Transferable adversarial attacks for image and video object detection," arXiv preprint arXiv:1811.12641, 2019. (7pgs).
Xie et al.,"Mitigating adversarial effects through randomization," arXiv preprint arXiv:1711.01991, 2018. (16pgs).
Xie et al.,"Adversarial examples for semantic segmentation and object detection," arXiv preprint arXiv:1703.08603, 2017. (12pgs).
Xie et al.,"Feature denoising for improving adversarial robustness," arXiv preprint arXiv:1812.03411, 2019. (9pgs).
Zhao et al.,"A modulation module for multi-task learning with applications in image retrieval," arXiv preprint arXiv:1807.06708, 2018. (16pgs).
Redmon et al.,"YOLOv3: An incremental improvement," arXiv preprint arXiv:1804.02767, 2018. (6pgs).
Ren et al.,"Faster R-CNN:Towards real-time object detection with region proposal networks," arXiv preprint arXiv:1506.01497, 2016. (14pgs).
Rosenfeld et al.,"Edge and curve detection for visual scene analysis," IEEE Trans, Comput., 20(5):562-569, 1971. (2pgs).
Samangouei et al.,"Defense-GAN: Protecting classifiers against adversarial attacks using generative models," arXiv preprint arXiv:1805.06605, 2018. (17pgs).
Simonyan et al.,"Very deep convolutional networks for large-scale image recognition," arXiv preprint arXiv:1409.1556, 2015. (14pgs).
Song et al.,"Pixeldefend: Leveraging generative models to understand and defend against adversarial examples," arXiv preprint arXiv:1710.10766, 2018. (20pgs).
Szegedy et al.,"Going deeper with convolutions," arXiv preprint arXiv:1409.4842, 2014. (12pgs).
Szegedy et al.,"Scalable,high-quality object detection," arXiv preprint arXiv:1412.1441, 2015. (10pgs).
Szegedy et al.,"Intriguing properties of neural networks," arXiv preprint arXiv:1312.6199, 2014. (10pgs).
Tram'er et al.,"Ensemble adversarial training: Attacks and defenses," arXiv preprint arXiv:1705.07204, 2018. (20pgs).
Liu et al.,"DPatch: Attacking object detectors with adversarial patches," arXiv preprint arXiv:1806.02299, 2019. (8pgs).
Lu et al.,"Adversarial examples that fool detectors," arXiv preprint arXiv:1712.02494, 2017. (9pgs).
Madry et al.,"Towards deep learning models resistant to adversarial attacks," arXiv preprint arXiv:1706.06083, 2017. (27pgs).
Meng et al.,"MagNet: a two-pronged defense against adversarial examples," arXiv preprint arXiv:1705.09064, 2017. (13pgs).
Metzen et al.,"On detecting adversarial perturbations," arXiv preprint arXiv:1702.04267, 2017. (12pgs).
Moosavi-Dezfooli et al.,"Deep-Fool: a simple and accurate method to fool deep neural networks," arXiv preprint arXiv:1511.04599, 2016. (9gps).
Nguyen et al.,"Deep neural networks are easily fooled: High confidence predictions for unrecognizable images," arXiv preprint arXiv:1412.1897, 2015. (20pgs).
Prakash et al.,"Deflecting adversarial attacks with pixel deflection," arXiv preprint arXiv:1801.08926, 2018. (17pgs).
J. Redmon,"Darknet: Open source neural networks in C," [online], [Retrieved Aug. 10, 2020]. Retrieved from Internet <URL: http://pjreddie.com/darknet/>, 2013-2016. (5pgs).
Redmon et al.,"You only look once: Unified, real-time object detection," arXiv preprint arXiv:1506.02640, 2016. (10pgs).

\* cited by examiner

200

205

SYSTEMS AND METHODS FOR ADVERSARIALLY ROBUST OBJECT DETECTION

BACKGROUND

A. Technical Field

The present disclosure relates generally to systems and methods for object detection in images. More particularly, the present disclosure relates to systems and methods for adversarially robust object detection.

B. Background

Object detection is a computer vision technique that deals with detecting instances of semantic objects in images. It is a natural generalization of the vanilla classification task as it outputs not only the object label as in classification but also the location. Many object detection approaches have been developed and object detectors powered by deep nets have emerged as an indispensable component in many vision systems of real-world applications.

It has been shown that object detectors may be attacked by maliciously crafted inputs. Given its critical role in applications such as surveillance and autonomous driving, it is important to investigate approaches for defending object detectors against various adversarial attacks. However, while many works have shown it is possible to attack a detector, very few efforts have been devoted to improve detector robustness.

Accordingly, what is needed are systems and methods for adversarially robust object detection for performance improvement.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
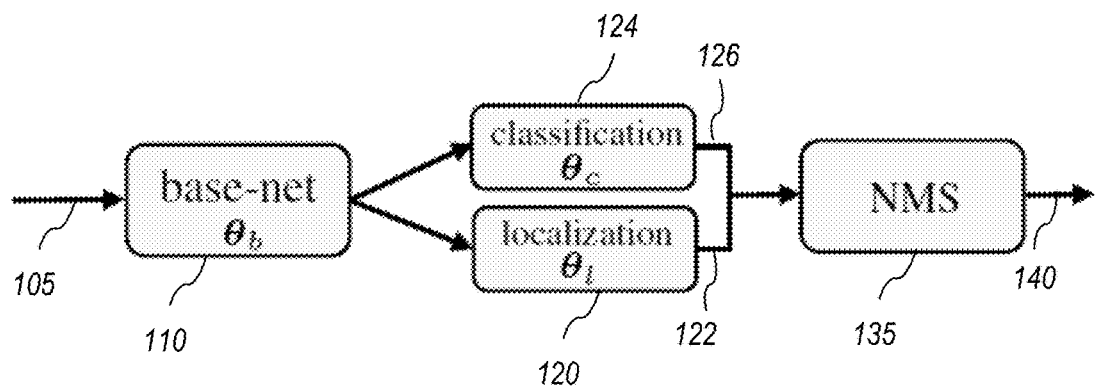
FIG. 1 depicts system architecture of a one-stage detector, according to embodiments of the present disclosure.

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Deep learning models have been widely applied to many vision tasks such as classification and object detection. One impeding factor of deep learning models is robustness. It has been shown that deep net-based classifiers are vulnerable to adversarial attack, i.e., there exist adversarial examples that are slightly modified but visually indistinguishable version of the original images that cause the classifier to generate incorrect predictions. Many efforts have been devoted to improve the robustness of classifiers.

Object detection is a computer vision technique that deals with detecting instances of semantic objects in images. It is a natural generalization of the vanilla classification task as it outputs the object label not only in a classification domain but also in a location domain. Many object detection approaches have been developed during the past several years and object detectors powered by deep nets have emerged as an indispensable component in many vision systems of real-world applications.

Recently, it has been shown that object detectors may be attacked by maliciously crafted inputs. Given its critical role in applications such as surveillance and autonomous driving, it is important to investigate approaches for defending object detectors against various adversarial attacks. A standard model may fail completely on an adversarial image, while a robust model may still produce reasonable detection results. However, while many works have shown it is possible to attack a detector, it remains largely unclear whether it is possible to improve the robustness of the detector and what is a practical approach for that. The present patent document disclose system and method embodiments for adversarially robust object detection. Various experiments shown that it is possible to improve the robustness of an object detector against various types of attacks. Practical approach embodiments are disclosed for achieving improved robustness by generalizing the adversarial training framework from classification to detection.

Some of the contributions of this patent document include:

i) A categorization and analysis of different attacks for object detectors are provided, revealing their shared underlying mechanisms; ii) Interactions between different tasks losses and their implication on robustness are highlighted and analyzed; iii) Embodiments of adversarial training frameworks from classification to detection are generalized and embodiments of adversarial training approaches are developed to properly handle interactions between task losses for improving detection robustness.

B. Some Related Work

1. Attacks and Adversarial Training for Classification

Adversarial examples have been investigated for general learning-based classifiers. As a learning-based model, deep networks are vulnerable to adversarial examples. Many variants of attacks and defenses have been developed. Fast gradient sign method (FGSM) and Projective Gradient Descend (PGD) are two representative approaches for white-box adversarial attack generation. In white box attacks, the attacker has access to image model's parameters; while in black box attacks, the attacker has no access to these parameters. Adversarial training is an effective defense method against adversarial attacks. It achieves robust model training by solving a minimax problem, where the inner maximization generates attacks according to the current model parameters while the outer optimization minimizes the training loss with respect to model parameters.

2. Object Detection and Adversarial Attacks

Many successful object detection approaches have been developed during the past several years, including one-stage and two-stage variants. Two stage detectors refine proposals from the first stage by one or multiple refinement steps. In one or more embodiments of this patent document, the focus is on one-stage detectors due to their essential role in different variants of detectors. A number of attacks for object detectors have been developed very recently. Some extend the attack generation method from classification to detection and demonstrate that it is possible to attack object detectors using a designed classification loss. Some generate adversarial examples that fool detectors for stop sign and face detections. Some develop physical attacks for a Faster Region-based Convolutional Neural Network (Faster RCNN) and adapt the expectation-over-transformation idea for generating physical attacks that remain effective under various transformations such as view-point variations. Some propose to attack a region-proposal network (RPN) with a specially designed hybrid loss incorporating both classification and localization terms. Apart from the full images, it is also possible to attack detectors by restricting the attacks to be within a local region.

C. Method Embodiments for Object Detection and Attacks

In this section, one or more object detection embodiments are disclosed and connections between many variants of attacks are discussed.

1. Embodiments of Object Detection as Multi-Task Learning

FIG. 1 depicts system architecture of a one-stage detector, according to embodiments of the present disclosure. The one-stage detector comprises a base-net 110, a localization module 120, and a classification module 124, and a non-maximum suppression (NMS) module 135. The base-net 110 (with parameters $\theta_b$) is shared for tasks by the classification module 124 (with parameters $\theta_c$) and the localization module 120 (with parameters $\theta_l$). $\theta=[\theta_b, \theta_c, \theta_l]$ denotes full parameters for the detector. For training, the NMS module 135 may be removed and task losses are appended for classification and localization respectively.

In one or more embodiments, an object detector $f(x) \rightarrow \{p_k, b_k\}_{k=1}^{K}$ takes an image 105 (e.g. $x \in [0,255]^n$) as input and outputs a varying number of K detected objects, each represented by a probability vector 126 $p_k \in \mathbb{R}^C$ over C classes (including background) and a bounding box 122 $b_k=[x_k, y_k, w_k, h_k]$. In one or more embodiments, NMS is applied to remove redundant detections for the final detections 140.

In one or more embodiments, the detector $f(\cdot)$ is parametrized by $\theta$ for training. Then, the training of the detector boils down to the estimation of θ, which may be formulated as follows:

$$\min_\theta \mathbb{E}_{(x,\{y_k,b_k\})\sim \mathcal{D}} \mathcal{L}(f_\theta(x), \{y_k, b_k\}). \quad (1)$$

x denotes the training image and $\{y_k, b_k\}$ denotes the ground-truth (class label $y_k$ and the bounding box $b_k$) sampled from the dataset $\mathcal{D}$. In one or more embodiments, to avoid notation clutter without loss of generality, the expectation over data is dropped and subsequent derivations are presented with a single example as follows:

$$\min_\theta \mathcal{L}(f_\theta(x), \{y_k, b_k\}) \quad (2)$$

$\mathcal{L}(\cdot)$ is a loss function measuring the difference between the output of $f_\theta(\cdot)$ and the ground-truth and the minimization of it (over the dataset) leads to a proper estimation of θ. In practice, it may be instantiated as a combination of classification loss and localization loss as follows:

$$\min_\theta \text{loss}_{cls}(f_\theta(x), \{y_k, b_k\}) + \text{loss}_{loc}(f_\theta(x), \{y_k, b_k\}). \quad (3)$$

As shown in Equation (3), the classification and localization tasks share some intermediate computations including the base-net (c.f. FIG. 1). However, different parts of the output from $f_\theta(\cdot)$ are used for computing losses emphasizing on different aspects, i.e., classification and localization performance, respectively. This is a design choice for sharing feature and computation for potentially relevant tasks, which may be considered an instance of multi-task learning.

2. Embodiments of Detection Attacks Guided by Task Losses

Many different attack methods for object detectors have been developed very recently. Although there are many differences in the formulations of these attacks, when viewed from the multi-task learning perspective as pointed out in Section D.1, they have the same framework and design principle: an attack to a detector can be achieved by utilizing variants of individual task losses or their combinations. This provides a common grounding for understanding and comparing different attacks for object detectors. From this perspective, existing attack methods may be categorized in Table 1. It is clear that some methods use classification loss, while other methods also incorporate localization loss. There are two perspectives for explaining the effectiveness of individual task loss in generating attacks: i) the classification and localization tasks share a common base-net, implying that the weakness in the base-net will be shared among all tasks built upon it; ii) while the classification and localization outputs have dedicated branches for each task beyond the shared base-net, they are coupled in the testing phase due to the usage of NMS, which jointly use class scores and bounding box locations for redundant prediction pruning.

Although many attacks have been developed and it is possible to come up with new combinations and configurations following the general principle, there is a lack of understanding on the role of individual components in model robustness. The present patent document discloses one or more embodiments to build up the understanding, and embodiments of robust training methods for object detectors are detailed below.

D. Adversarially Robust Detection Embodiments

1. The Roles of Task Losses in Robustness Learning

In one or more embodiments, as the classification and localization tasks of a detector share a base-net (cf. FIG. 1), the two tasks inevitably affect each other even though the input images may be manipulated according to a criterion trailered for one individual task. In the present patent disclosure, analysis on the role of task losses in model robustness was conducted from several perspectives.

Figure 2A:
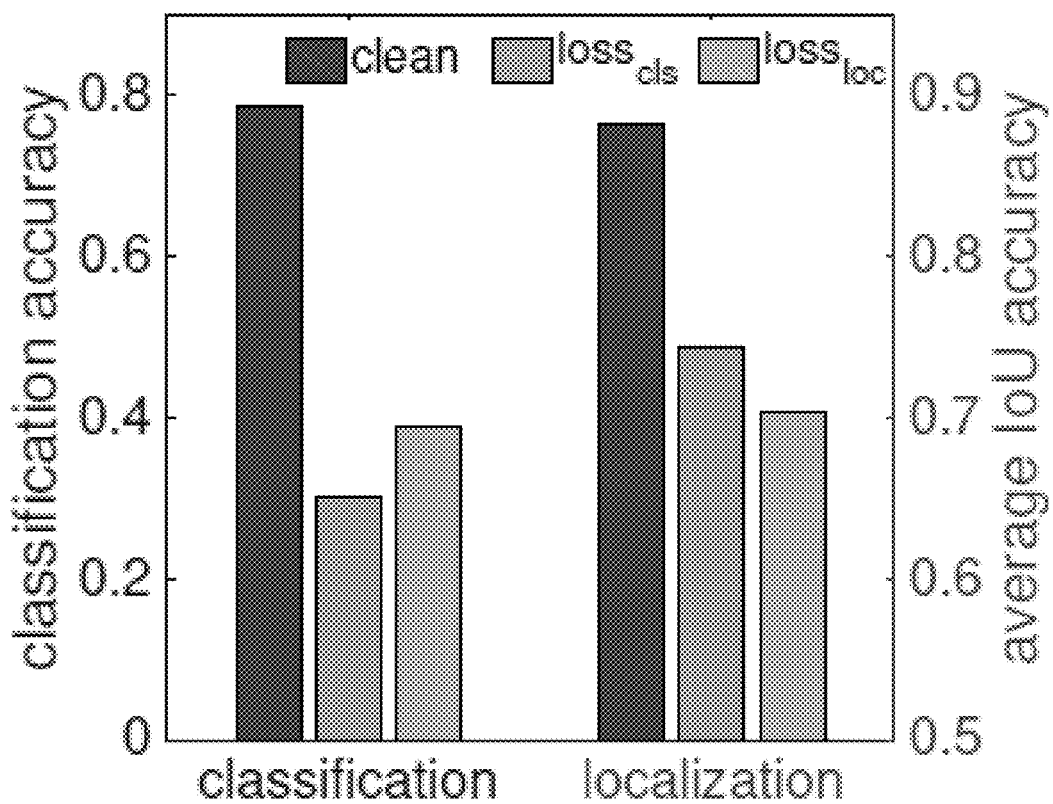
FIG. 2A depicts mutual impacts of task losses, according to embodiments of the present disclosure.
Figure 2B:
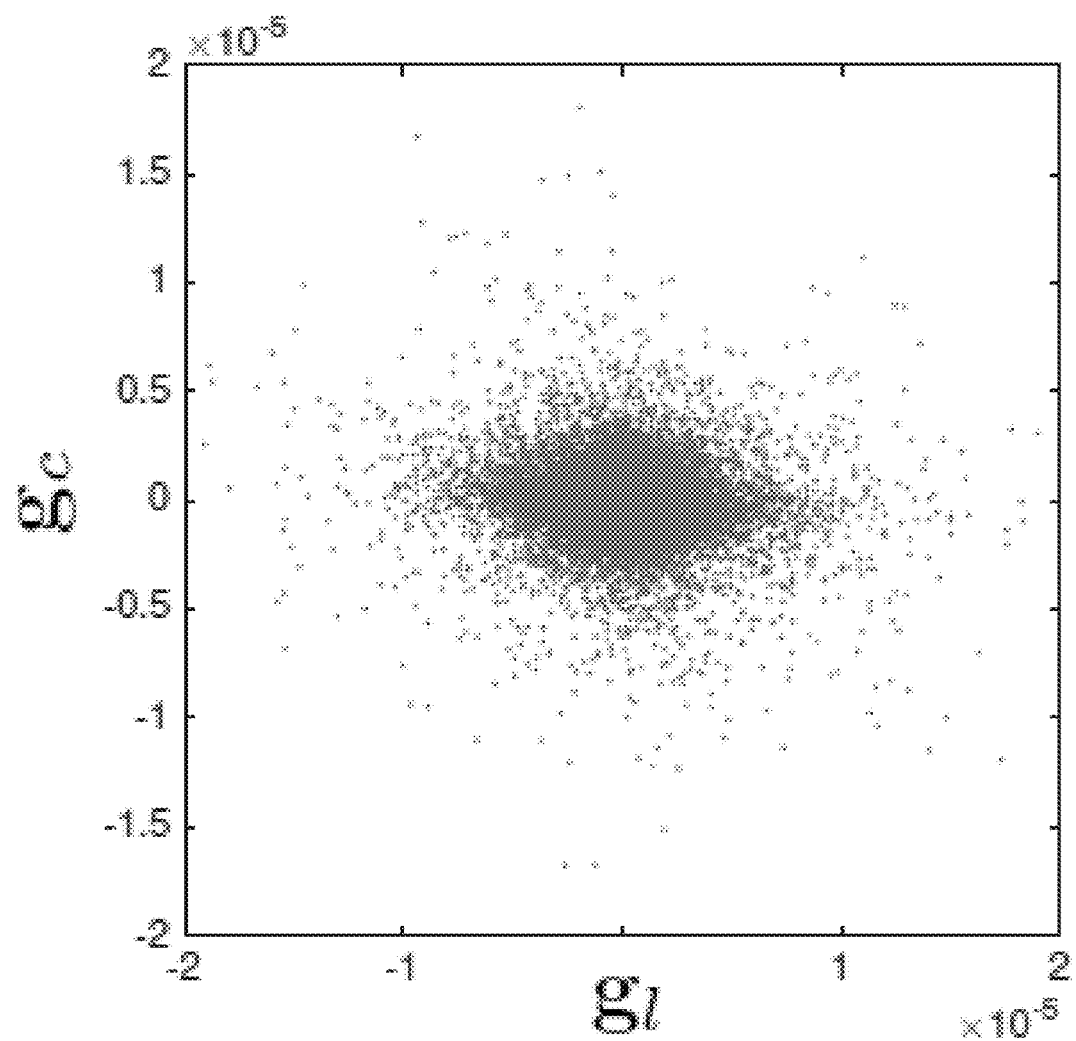
FIG. 2B depicts a scatter plot of task gradients for classification and localization, according to embodiments of the present disclosure.

Mutual Impacts of Task Losses. In the present patent disclosure, one empirical observation is that different tasks have mutual impacts and the adversarial attacks trailered for one task may reduce the performance of the model on the other task. To show this, a marginalized view is taken over one factor while investigating the impact of the other in one or more embodiments. In an embodiment, when considering classification, the factor of location may be marginalized out and the problem may be reduced to a multi-label classification task; in another embodiment, when focusing on localization only, the class information may be marginalized out and a class agnostic object detection problem may be obtained. The results with single step PGD and budget 8 are shown in FIG. 2A and FIG. 2B. Specifically, FIG. 2A shows model performance on classification and localization under different attacks: clean image, $\text{loss}_{cls}$-based attack, and $\text{loss}_{loc}$-based attack. In one or more embodiments, the model is a standard detector trained on clean images. The performance metric is detailed in text. FIG. 2B shows a scatter plot of task gradients for classification $g_c$ and localization $g_l$. The performances are measured on detection outputs prior to NMS to better reflect the raw performance.

In one or more embodiments, a candidates set is first determined as foreground candidates whose prior boxes have an intersect over union (IoU) value larger than 0.5 with any of the ground-truth annotation. This ensures that each selected candidate has a relative clean input for both tasks. For classification, the classification accuracy on the candidate set is computed. For localization, the average IoU of the predicted bounding boxes with ground-truth bounding boxes are computed. In one or more embodiments, the attack is generated with one-step PGD and a budget of 8. It may be observed from the results in FIG. 2A that the two losses interact with each other. The attacks based on the classification loss ($\text{loss}_{cls}$) reduces the classification performance and decreases the localization performance at the same time. Similarly, the localization loss induced attacks ($\text{loss}_{loc}$) reduces not only the location performance but the classification performance as well. In one or more embodiments, this may be viewed as a type of cross-task attack transfer: i.e., when using only the classification loss (task) to generate adversarial images, the attacks can be transferred to localization tasks and reduce its performance and vice versa. This is one of the reason why adversarial images generated based on individual task losses may effectively attack object detectors.

Misaligned Task Gradients. In the present patent disclosure, another empirical observation is that the gradients of the two tasks share certain level of common directions but are not fully aligned, leading to misaligned task gradients that can obfuscate the subsequent adversarial training. In one or more embodiments, to show this, the image gradients derived from the two losses (referred to as task gradients), i.e., $g_c=\nabla_x \text{loss}_{cls}$ and $g_l=\nabla_x \text{loss}_{loc}$, are analyzed. The element-wise scatter plot between $g_c$ and $g_l$ is shown in FIG. 2B. Several observations are noted: i) the magnitudes of the task gradients are not the same (different value ranges), indicating the potential existence of imbalance between the two task losses; ii) the direction of the task gradients are inconsistent (non-diagonal), implying the potential conflicts between the two tasks gradients. The task gradient domains representing the domain of a task maximizing gradient for each respective task (c.f., Equation (5)) are further visualized as in FIG. 3. Given a single clean image x, each dot in the picture represents one adversarial example generated by solving Equation (5) staring from a random point within the E-ball around x. Different shapes encode the task losses used for generating adversarial examples ("x": $\text{loss}_{cls}$, ".": $\text{loss}_{loc}$). Therefore, the samples form empirical images of the corresponding task domains. It is observed that the two task domains have both overlaps and distinctive regions.

Figure 3:
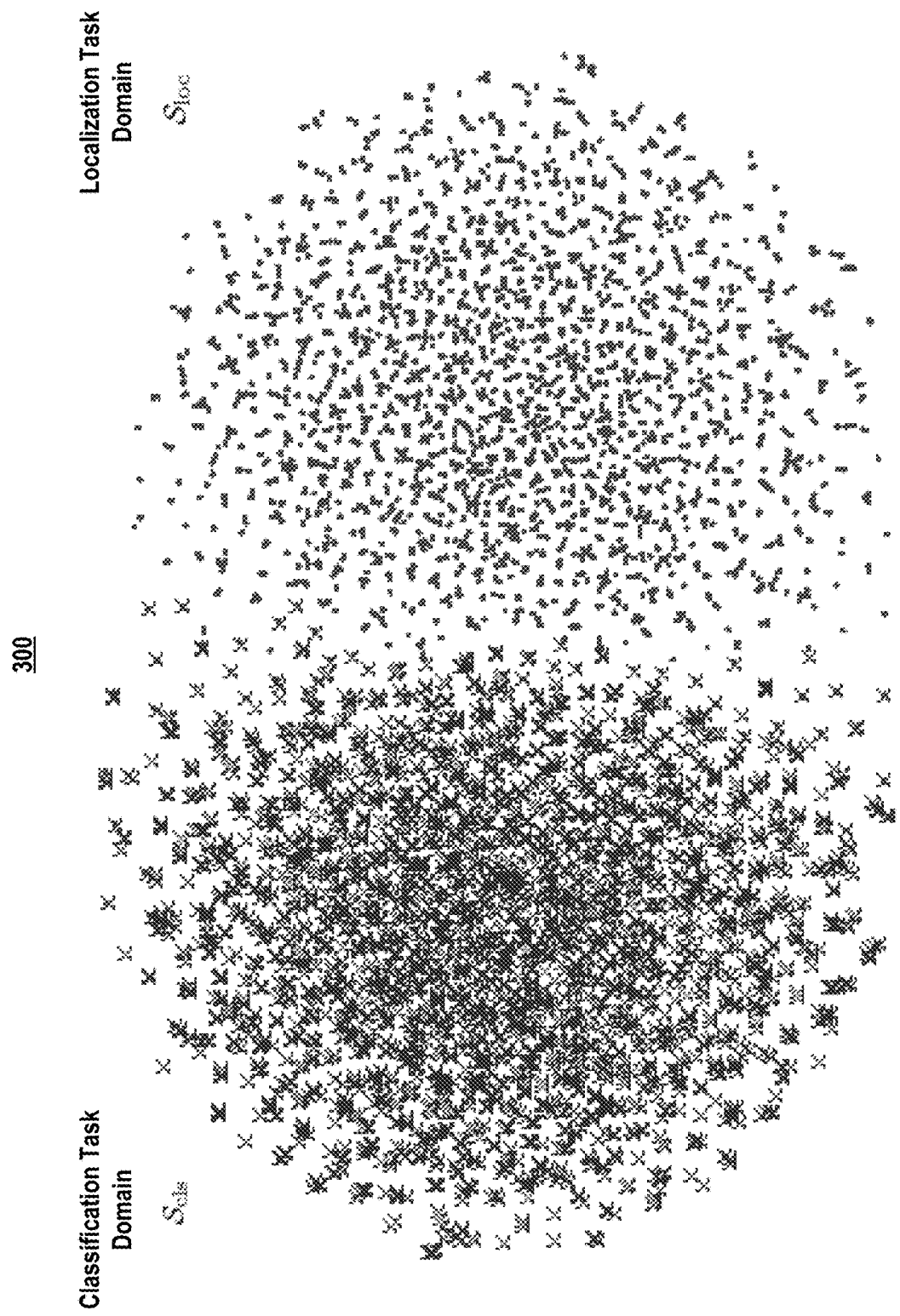
FIG. 3 depicts visualization of task domains $\mathcal{S}_{cls}$ and $\mathcal{S}_{loc}$ using t-SNE, according to embodiments of the present disclosure.

As shown in FIG. 3, the fact the two domains are not fully separated (i.e. they do not collapse to two isolated clusters) further reinforces previous observation on their mutual impacts. The other aspect that they have a significant non-overlapping portion is another reflection of the misalignments between task gradients (task domains).

2. Adversarial Training Embodiments for Robust Detection

Motivated by the preceding analysis, the following formulation, which is a minimax formulation, for robust object detection training is introduced according to one or more embodiments:

$$\min_\theta \left[ \max_{\tilde{x} \in S_{cls} \cup S_{loc}} \mathcal{L}(f_\theta(\tilde{x}), \{y_k, b_k\}) \right] \quad (4)$$

Where $y_k$ is class label, $b_k$ is bounding box, task-oriented domains $S_{cls}$ and $S_{loc}$ represent the permissible domains induced by each individual task.

$$S_{cls} \triangleq \left\{ \tilde{x} \,\middle|\, \underset{\tilde{x} \in S_x}{\text{argmax}} \, \text{loss}_{cls}(f(\tilde{x}), \{y_k\}) \right\} \quad (5)$$

$$S_{loc} \triangleq \left\{ \tilde{x} \,\middle|\, \underset{\tilde{x} \in S_x}{\text{argmax}} \, \text{loss}_{loc}(f(\tilde{x}), \{b_k\}) \right\}$$

Where $S_x$ is defined as $S_x = \{z | z \in B(x,\varepsilon) \cap [0,255]^n\}$, and $B(x,\varepsilon) = \{z | \|z-x\|_\infty \le \varepsilon\}$ denotes the $\ell_\infty$-ball with the clean image x as center and the perturbation budge $\varepsilon$ as radius. $\mathcal{P}_{S_x}(\cdot)$ is denoted as a projection operator projecting the input into the feasible region $S_x$. There are several crucial differences compared with the conventional adversarial training for classification:

Multi-task sources for adversary training: different from the adversarial training in classification case where only a single source is involved, multiple (in the presence of multiple objects) and heterogeneous (both classification and localization) sources of supervisions for adversary generation and training are used in one or more embodiments of the present patent disclosure, thus generalizing the adversarial training for classification.

Task-oriented domain constraints: different from the conventional adversarial training setting which uses a task-agnostic domain constraint $S_x$, a task-oriented domain constraint $S_{cls} \cup S_{loc}$ is introduced in embodiments of the present patent disclosure to restrict the permissible domain as the set of images that maximize either the classification task losses or the localization losses. The final adversarial example used for training is the one that maximizes the overall loss within this set. One advantage of the introduced formulation with task-domain constraints is the benefit from generating adversarial examples guided by each task without suffering from the interferences between them.

In one or more embodiments, when the task-oriented domain is relaxed to $S_x$, the coordinates of the bounding box are set corresponding to the full image and a single class label is assigned to the image, then the proposed formulation (4) may be reduced to the conventional adversarial training setting for classification. Therefore, embodiments of the presented adversarial training for robust detection may be viewed as a natural generalization of the conventional adversarial training under the classification setting. However, it shall be noted that while both tasks contribute to improving the model robustness in expectation according to their overall strengths, there is no interference between the tasks for generating individual adversarial example due to the task oriented domain in contrast to $S_x$ (c.f. Section E.3).

Figure 4:
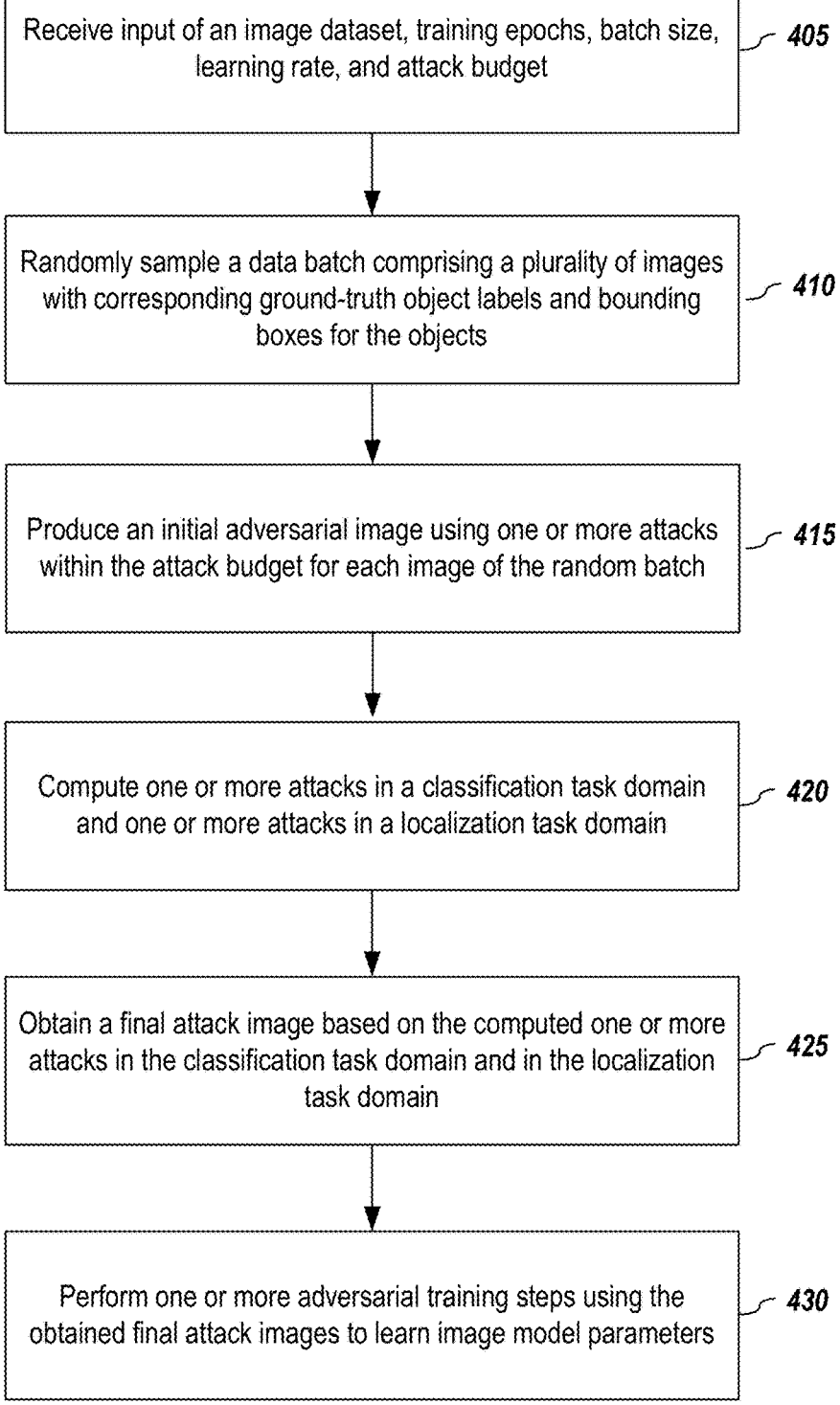
FIG. 4 depicts a methodology for adversarial training for robust detection, according to embodiments of the present disclosure.

In one or more embodiments, training object detection models that are resistant to adversarial attacks may be boiled down to solving a minimax problem as in formulation (4). In one or more embodiments, the problem may be approximately solved by replacing the original training images with the adversarially perturbed ones obtained by solving the inner problem, and then conducting training of the model using the perturbed images as typically done in adversarial training. In one or more embodiments, the inner maximization may be approximately solved using a variant of FGSM for efficiency. For incorporating the task-oriented domain constraint, in one or more embodiment, FGSM steps are taken within each task domain and then the one that maximizes the overall loss is selected. FIG. 4 depicts a methodology for adversarial training for robust detection, according to embodiments of the present disclosure. Detailed adversarial training processes for robust detection are summarized in Methodology 1.

An image dataset $\mathcal{D}$, training epochs T, batch size S, learning rate $\gamma$, and attack budget E are received (405) as input. The data batch comprises a plurality of images $x_i$ with each image comprising one or more objects associated with corresponding ground-truth object labels $y_k^i$ and bounding boxes $b_i^k$. For each training epoch, a random batch of images is selected (410) from the image dataset $\mathcal{D}$. An initial adversarial image $\tilde{x}^i$ is produced (415) using one or more attacks within the attack budget e for each image of the random batch. One or more attacks $\bar{x}_{cls}^i$ in a classification task domain and one or more attacks $\bar{x}_{loc}^i$ in a localization task domain are computed (420). In one or more embodiments, the attacks $\bar{x}_{cls}^i$ and the attacks $\bar{x}_{loc}^i$ may be computed sequentially (in an order shown in Methodology 1 or the opposite) or in parallel. In one or more embodiments, image gradients derived from classification loss and localization loss (i.e., $g_c=\nabla_x \text{loss}_{cls}$ and $g_l=\nabla_x \text{loss}_{loc}$) using the initial adversarial image $\tilde{x}^i$ are used to compute attacks in the classification task domain and the localization task domain respectively. A final attack image is obtained (425) based on the computed one or more attacks $\bar{x}_{cls}^i$ and the computed one or more attacks $\bar{x}_{loc}^i$. In one or more embodiments, the final attack image is chosen between the attacks $\bar{x}_{cls}^{i}$ and the attacks $\bar{x}_{loc}^{i}$. For example, a scalar binary selection operator m may be used in comparing a classification task loss using the attacks $\bar{x}_{cls}^{i}$ and a localization task loss using the attacks $\bar{x}_{loc}^{i}$. The attacks corresponding to the larger loss are select as the final attack images. Adversarial training step is then performed (430) to learn image model parameters by minimizing the minimax formulation (4).

---

Methodology 1 Adversarial Training Embodiments for Robust Detection

Input: dataset $\mathcal{D}$, training epochs T, batch size S, learning rate γ, attack budget ϵ
for t = 1 to T do
    For random batch $\{x^i, \{y_k^i, b_k^i\}\}_{i=1}^{S} \sim \mathcal{D}$ do
      • $\tilde{x}^i \sim B(x^i, \epsilon)$
      compute attacks in the classification task domain
      • $\bar{x}_{cls}^{i} = \mathcal{P}_{\mathcal{S}_x}(\tilde{x}^i + \epsilon \cdot \text{sign}(\nabla_x \text{loss}_{clc}(\tilde{x}^i, \{y_k^i\})))$
      compute attacks in the localization task domain
      • $\bar{x}_{loc}^{i} = \mathcal{P}_{\mathcal{S}_x}(\tilde{x}^i + \epsilon \cdot \text{sign}(\nabla_x \text{loss}_{loc}(\tilde{x}^i, \{b_k^i\})))$
      compute the final attack examples
      • $m = \mathcal{L}(\bar{x}_{cls}^{i}, \{y_k^i, b_k^i\}) > \mathcal{L}(\bar{x}_{loc}^{i}, \{y_k^i, b_k^i\})$
      • $\bar{x}^i = m \odot \bar{x}_{cls}^{i} + (1-m) \odot \bar{x}_{loc}^{i}$
      perform adversarial training step

• $\theta = \theta - \gamma \cdot \nabla_\theta \frac{1}{S} \sum_{i=1}^{S} \mathcal{L}(\bar{x}^i, \{y_k^i, b_k^i\}; \theta))$ end for
end for
Output: learned model parameter θ for object detection.

---

E. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

1. Experiment and Implementation Details

In one or more experimental settings, a single-shot multi-box detector (SSD) with VGG16 backbone were used as one of the representative single-shot detectors in experiments. Experiments with different detector architectures, including Receptive Field Block-based Detector (RFB), Feature Fusion Single Shot Detector (FSSD), and YOLO-V3, and backbones (VGG16, ResNet50, DarkNet53) are also conducted for comprehensive evaluations.

In one or more experimental settings, one or more datasets were used for training or testing. In one or more experimental settings, a "mean average precision" (mAP) with IoU threshold 0.5 was used for evaluating the performance of a detector.

In one or more experimental settings, all models were trained from scratch using SGD with an initial learning rate of $10^{-2}$, momentum 0.9, weight decay 0.0005 and batch size 32 with the multi-box loss. In one or more experimental settings, the size of the image for training was 300×300. Pixel value range was [0, 255] shifted according to dataset mean. In one or more experimental settings, for adversarial attacks and training, a budget e=8 was used, which roughly corresponded to a PSNR of 30 between the perturbed and original images.

2. Impacts of Task Losses on Robustness

In one or more experimental settings, the role of task losses in model robustness was investigated. For this purpose, a standard model and several variations of proposed robust model embodiments were introduced:

STD: standard training with clean image as the domain.
    CLS: using $\mathcal{S}_{cls}$ only as the task domain for training.
    LOC: using $\mathcal{S}_{loc}$ only as the task domain for training.

In one or more experimental settings, the performance of these models under attacks induced by individual task losses with different number of attack steps and budgets were systemically investigated as follows.

Figure 5A:
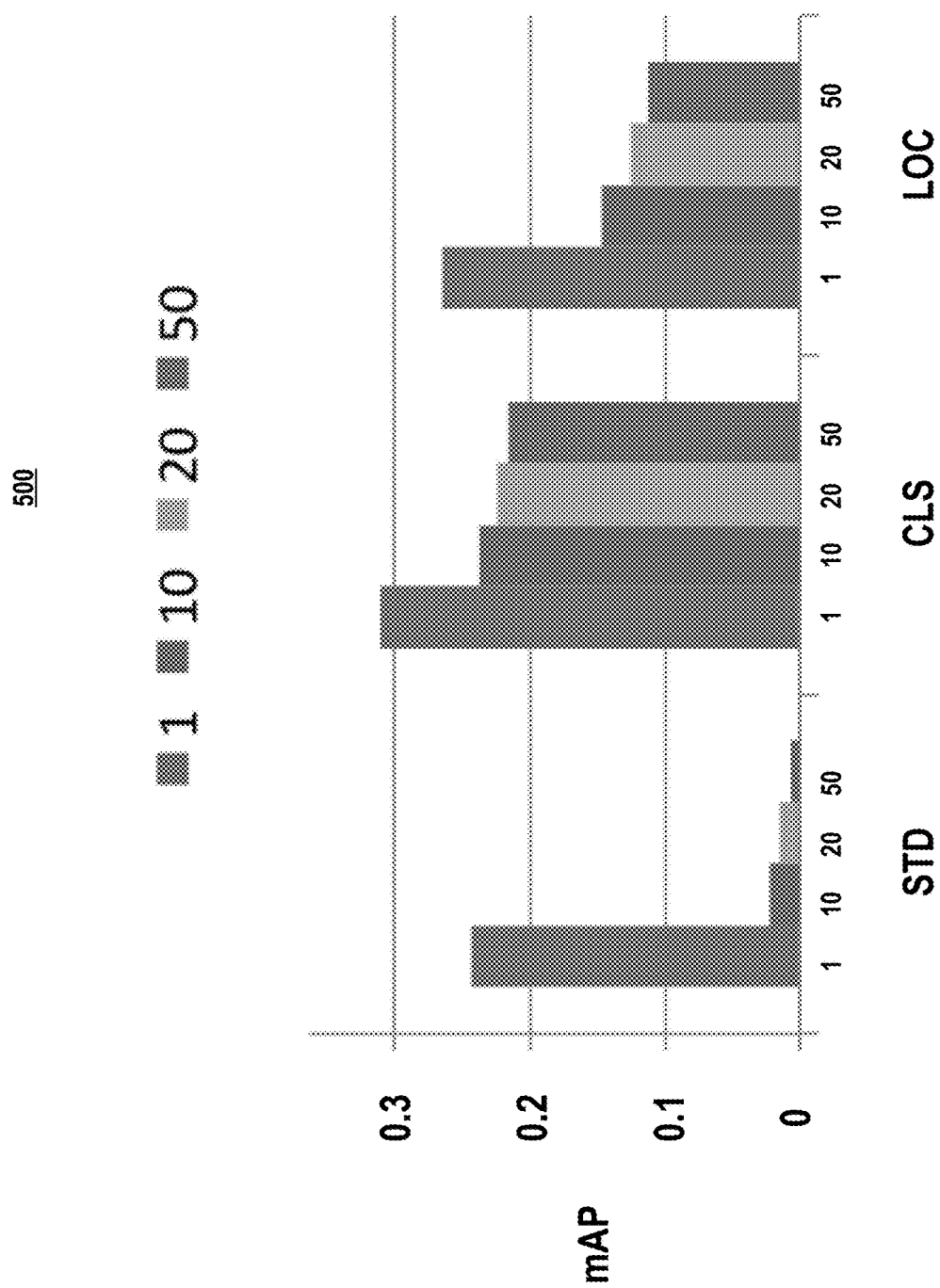
FIG. 5A graphically depicts model performance under different number of steps for $loss_{cls}$ based PGD attacks, according to embodiments of the present disclosure.
Figure 5B:
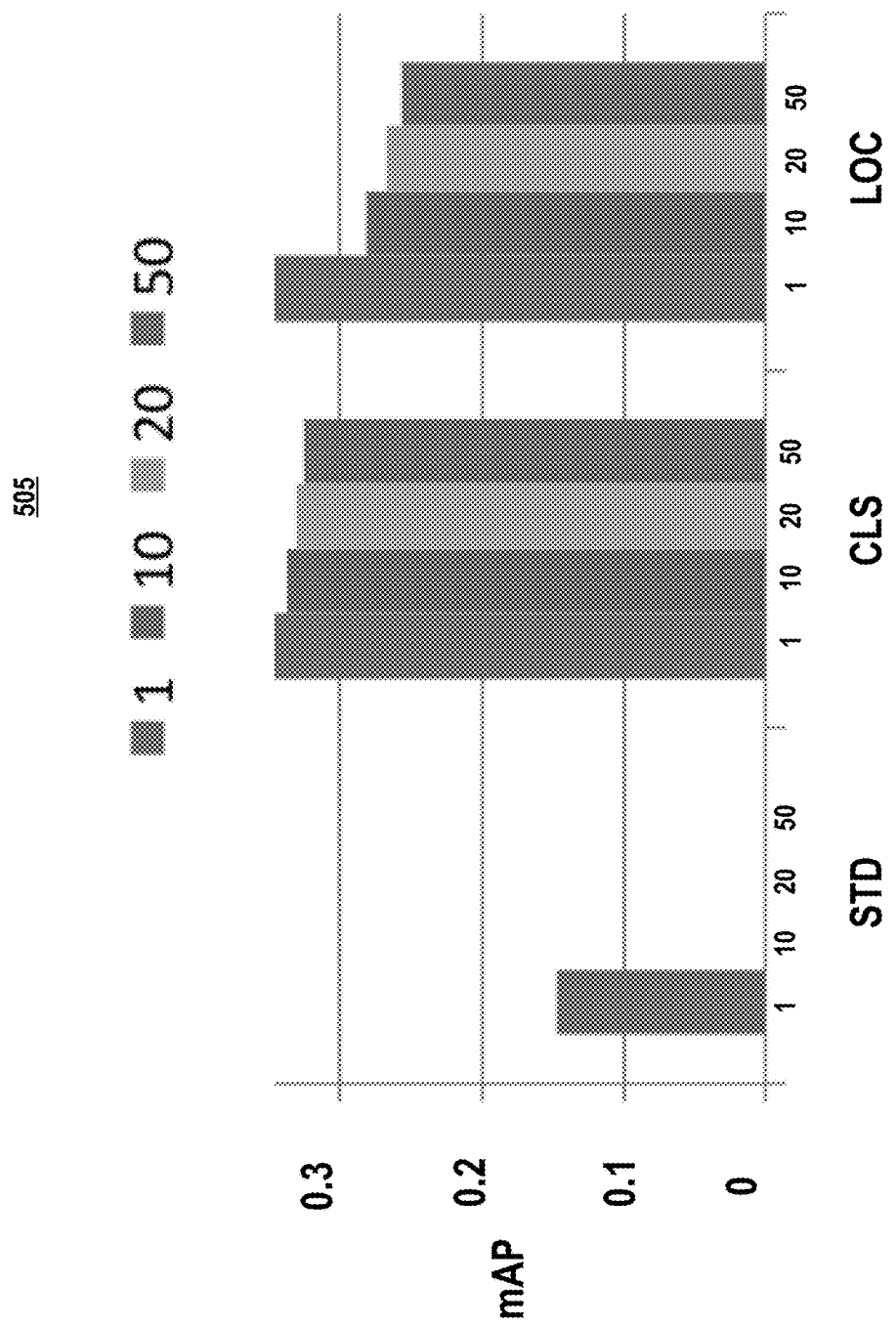
FIG. 5B graphically depicts model performance under different number of steps for $loss_{loc}$ based PGD attacks, according to embodiments of the present disclosure.

Attacks Under Different Number of Steps. In one or more experimental settings, the performance of models was first evaluated under attacks with different number of PGD steps and a fixed attack budget of 8. The results were shown in FIG. 5A and FIG. 5B. Specifically, FIG. 5A depicts model performance for $\text{loss}_{cls}$-based PGD attack and FIG. 5B depicts model performance for $\text{loss}_{loc}$-based PGD attack. Several interesting observations were noted from the results: I) the performance of the standard model (STD) dropped below all other robust models within just a few steps and decreases quickly (approaching zero) as the number of PGD steps increases, for both $\text{loss}_{cls}$-base and $\text{loss}_{loc}$-based attacks. These results implied that both types of attacks were very effective attacks for detectors; ii) all the robust models maintained a relative stable performance across different number of attack steps (1, 10, 20, or 50 steps corresponding to the four bars from left to right for all three models), indicating their improved robustness against adversarial attacks compared to the standard model.

Figure 6A:
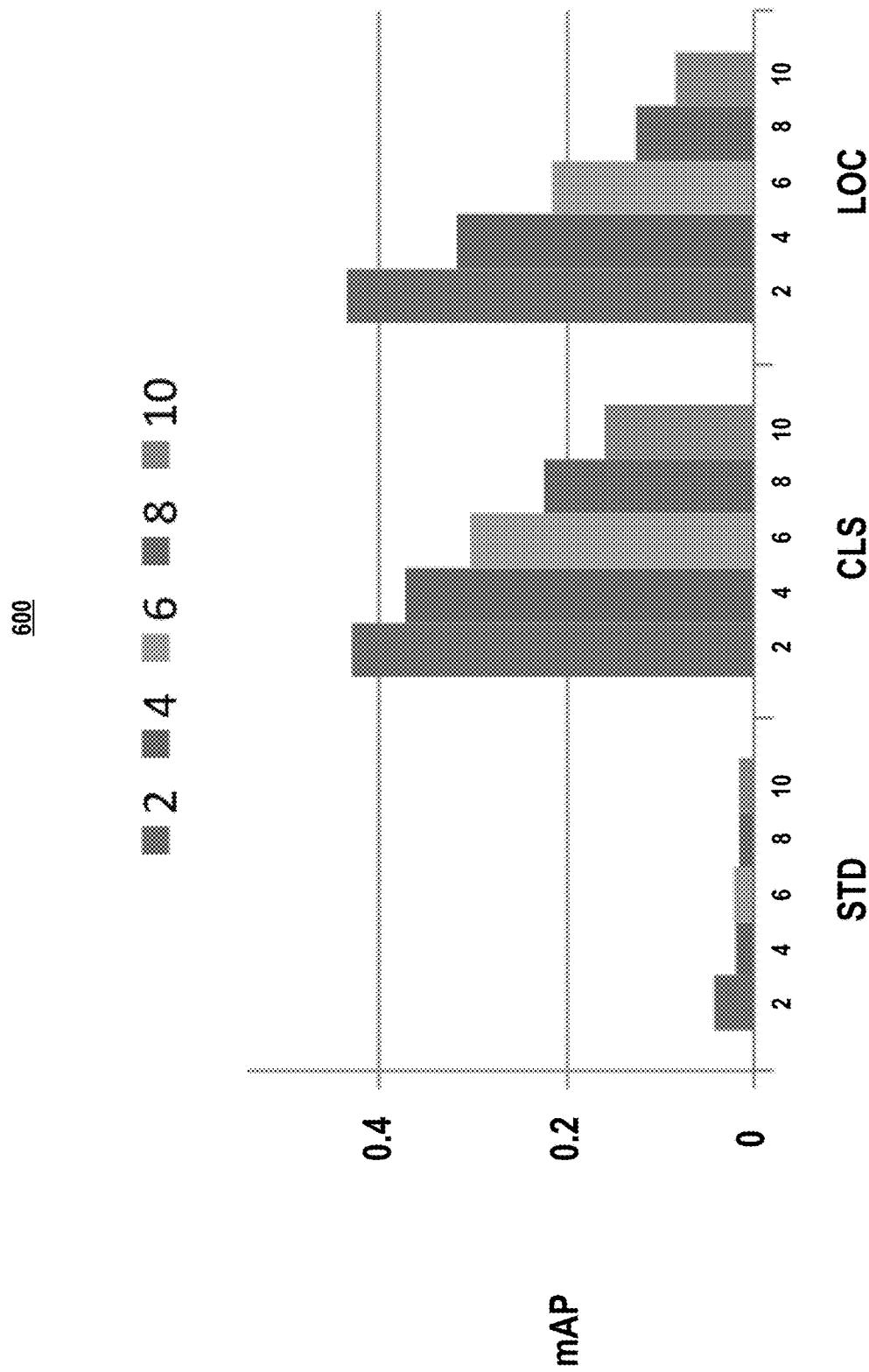
FIG. 6A graphically depicts model performance under different attack budgets for $loss_{cls}$ based PGD attacks, according to embodiments of the present disclosure.
Figure 6B:
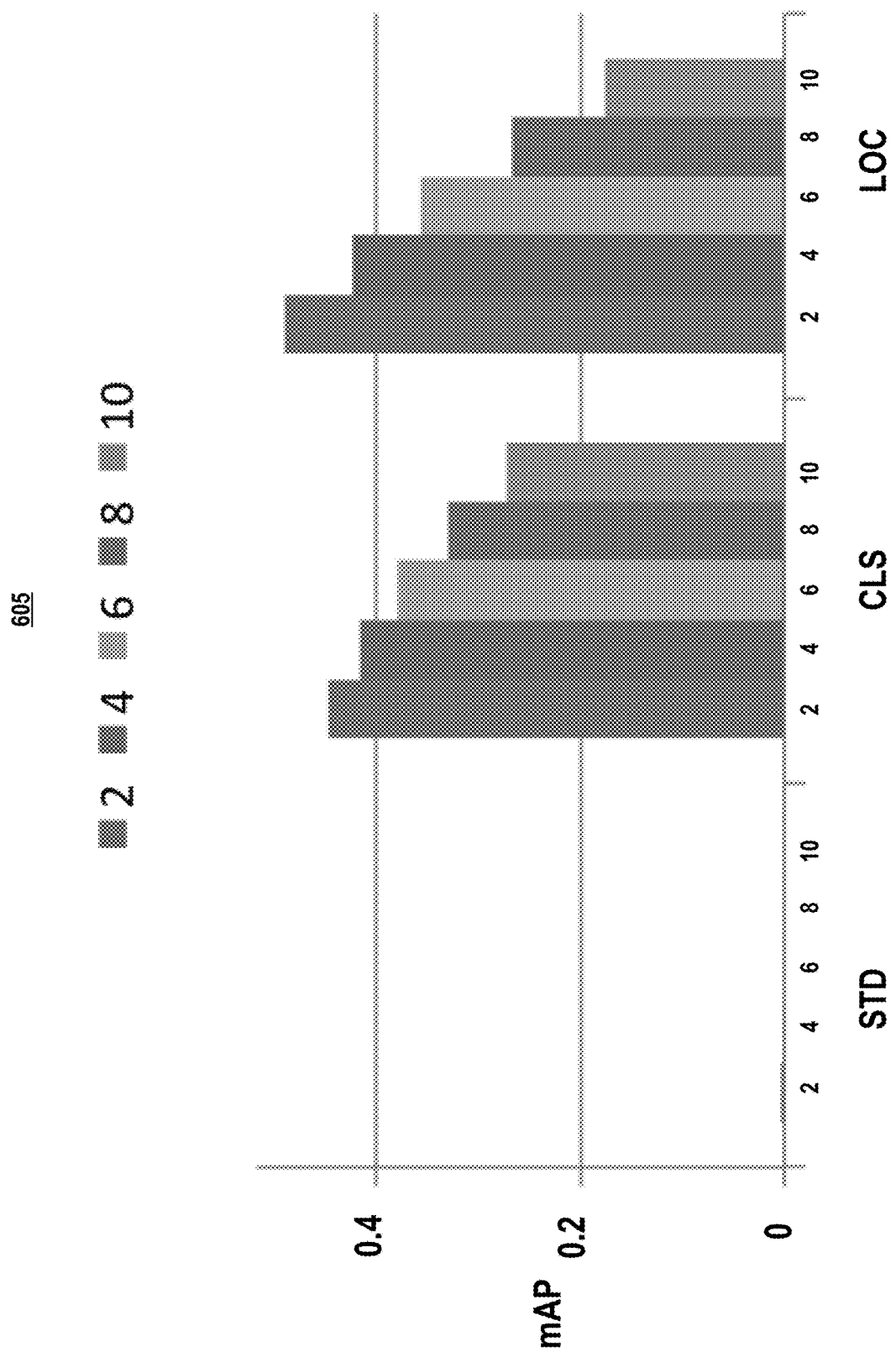
FIG. 6B graphically depicts model performance under different attack budgets for $loss_{loc}$ based PGD attacks, according to embodiments of the present disclosure.

Attacks with Different Budgets. In one or more experimental settings, model robustness was evaluated under a range of different attack budgets ε∈{2, 4, 6, 8, 10} and fixed steps of 20. The results were presented in FIG. 6A and FIG. 6B. Specifically, FIG. 6A depicts model performance for $\text{loss}_{cls}$-based PGD attack and FIG. 6B depicts model performance for $\text{loss}_{loc}$-based PGD attack. It was observed that the performance of the standard model trained with natural images (STD) drops significantly, e.g., from ~72% on clean images (not shown in figure) to ~4% with a small attack budget of 2. Robust models, on the other hand, degrade more gracefully as the attack budget increases, implying their improved robustness compared to the standard model. It was also observed that even with a small attack budget (e.g. ε=2), the detection results may change completely, implying that the standard model was very fragile in term of robustness, which was consistent with observation from FIG. 6A and FIG. 6B. It was also observed that the erroneous detections may have several forms: i) label flipping: the bounding box location is roughly correct but the class label is incorrect, e.g., "dinningtable" (ε:0ε2); ii) disappearing: the bounding box for the object is missing, e.g., "horse" and "person". (ε: 0ε2); iii) appearing: spurious detections of objects that do not exist in the image with locations not well aligned with any of the dominant objects, e.g., "chair" (ε: 0→2) and "pottedplant" (ε: 2→8). As the attack budget increased, the detection output further changed in terms of the three types of changes described above. It may also be observed that the attack image generated with ε=8 displayed noticeable, although not very severe, changes compared with the original one. Therefore, in one or more experimental settings, attack ε=8 was used as it was an attack budget large enough while a reasonable resemblance to the original image may be maintained.

3. Beyond Single-Task Domain

In one or more experimental settings, the impacts of task domains on robustness were further examined. The following approaches with different task domains were considered in addition to STD, CLS and LOC:

CON: using the conventional task agnostic domain $S_x$, which was essentially the direct application of the adversarial training for classification to detection;

MTD: using the task oriented domain $S_{cls} \cup S_{loc}$.

The results were summarized in Table 2. It was observed from comparison that different domains lead to different levels of model robustness. For example, for methods with a single task domain, LOC leads to less robust models compared with CLS. On the other hand, LOC has a higher clean accuracy than CLS. Therefore, it is not straightforward to select one single domain as it was unknown a priori which one of the task domains is the best. Simply relaxing the task domains as done in the conventional adversarial training CON led to compromised performance. Concretely, the performance of CON with task-agnostic task domain achieved an in-between or inferior performance compared to the models with individual task domains under different attacks. This implied that simply mixing the task domains leads to compromised performance, due to the conflicts between the task gradients (Section D.1). On the other hand, the robust model MTD using adversarial training with task oriented domain constraint may improve the performance over CON baseline. More importantly, when the task-oriented multi-task domain was incorporated, a proper trade-off and overall performance was observed compared with the single domain-based methods, implying the importance of properly handling heterogeneous and possibly imbalanced tasks in object detectors. In summary, the tasks may be imbalanced and contribute differently to the model robustness. As it was unknown a priori which is better, randomly adopting one or simply combining the losses (CON) may lead to compromised performance. MTD setting overcome this issue and achieved performance on par or better than best single domain models and the task-agnostic domain model.

TABLE 2

Impacts of task domains on model performance (mAP) and defense against attacks from literature (attack $\in$ = 8).

| attacks | | clean | $loss_{cls}$ | $loss_{loc}$ | DAG | RAP |
|---|---|---|---|---|---|---|
| standard | | 72.1 | 1.5 | 0.0 | 0.3 | 6.6 |
| | CLS | 46.7 | 21.8 | 32.2 | 28.0 | 43.4 |
| | LOC | 51.9 | 23.7 | 26.5 | 17.2 | 43.6 |
| Presented | CON | 38.7 | 18.3 | 27.2 | 26.4 | 40.8 |
| | MTD | 48.0 | 29.1 | 31.9 | 28.5 | 44.9 |
| avg | | 46.3 | 23.2 | 29.4 | 25.0 | 43.2 |

4. Defense Against Existing White-Box Attacks

To further investigate the model robustness, model embodiments were evaluated against representative attack methods. In one or more experimental settings, DAG and RAP were used as representative attacks according to Table 1. It is important to note that the attack used in training and testing were different. The results were summarized in Table 2. It was observed that the performances of robust models improve over the standard model by a large margin. CLS performed better in general than LOC and CON in terms of robustness against the two attacks from literature. The model using multi-task domains (MTD) demonstrated the best performance. MTD had a higher clean image accuracy than CLS and performs uniformly well against different attacks, thus overall was better and was used for reporting performance.

TABLE 1

Analysis of existing attack methods for object detection. "T" denotes "targeted attack" and "N" for "non-targeted attack

| | Components | | | |
|---|---|---|---|---|
| Attacks for | $loss_{cls}$ | | $loss_{loc}$ | |
| Object Detection | T | N | T | N |
| ShapeShifter | √ | | | |
| DFool, PhyAttack | | √ | | |
| DAG, Transfer | | √ | | |
| DPatch | √ | | √ | |
| RAP | | √ | √ | |
| BPatch | | √ | | √ |

ShapeShifter: S. Chen, et al., ShapeShifter: Robust physical adversarial attack on Faster R-CNN object detector. CoRR, abs/1804.05810, 2018.

DFool: J. Lu, et al., Adversarial examples that fool detectors. CoRR, abs/1712.02494, 2017.

PhyAttack: K. Eykholt, et al., Physical adversarial examples for object detectors. CoRR, abs/1807.07769, 2018.

DAG: C. Xie, et al., Adversarial examples for semantic segmentation and object detection. In International Conference on Computer Vision, 2017.

Transfer: X. Wei, et al., Transferable adversarial attacks for image and video object detection. CoRR, abs/1811.12641, 2018.

DPatch: X. Liu, et al., DPatch: Attacking object detectors with adversarial patches. CoRR, abs/1806.02299, 2018.

RAP: Y. Li, et al., Robust adversarial perturbation on deep proposal-based models. In British Machine Vision Conference, 2018.

BPatch: Y. Li, et al., Attacking object detectors via imperceptible patches on background. CoRR, abs/1809.05966, 2018.

5. Evaluation on Different Backbones

In one or more experimental settings, the effectiveness of embodiments of the presented approach was evaluated under different SSD backbones, including VGG16, ResNet50, and DarkNet53. Average performance under DAG and RAP attacks was reported in Table 3. It was observed that embodiments of the presented approach may boost the performance of the detector by a large margin. (20%-30% absolute improvements), across different backbones, demonstrating that embodiments of the presented approach perform well across backbones of different network structures with clear and consistent improvements over baseline models.

TABLE 3

Evaluation results on across different backbones

| SD-backbone | DAG | | RAP | |
| --- | --- | --- | --- | --- |
| | STD | Presented | STD | Presented |
| VGG16 | 0.3 | 28.5 | 6.6 | 44.9 |
| ResNet50 | 0.4 | 22.9 | 8.8 | 39.1 |
| DarkNet53 | 0.5 | 26.2 | 8.2 | 46.6 |

VGG16: K. Simonyan et al., Very deep convolutional networks for large-scale image recognition. International Conference on Learning Representations, 2015.

RedNet50: K. He, et al., Deep residual learning for image recognition. IEEE Conference on Computer Vision and Pattern Recognition, 2016.

DarkNet53: J. Redmon. Darknet: Open source neural networks in C, 2013-2016.

6. Results on Different Detection Architectures

In one or more experimental settings, embodiments of the presented approach may also be applicable to different detection architectures. For demonstration, different detection architectures, including Single shot multibox detector (SSD), Receptive Field Block-based Detector (RFB), Feature Fusion Single Shot Detector (FSSD) and YOLO-V3, were used. The input image size for YOLO was 416×416 and all others takes 300×300 images as input. Average performance under DAG and RAP attacks was summarized in Table 4. It was observed that the proposed method may improve over the standard method significantly and consistently for different detector architectures. This clearly demonstrated the applicability of embodiments of the presented approach across various detector architectures.

TABLE 4

Evaluation results on different detection architectures

| architecture | DAG | | RAP | |
| --- | --- | --- | --- | --- |
| | STD | Presented | STD | Presented |
| SSD + VGG16 | 0.3 | 28.5 | 6.6 | 44.9 |
| RFB + ResNet50 | 0.4 | 27.4 | 8.7 | 48.7 |
| FSSD + DarkNet53 | 0.3 | 29.4 | 7.6 | 46.8 |
| YOLO* + DarkNet53 | 0.1 | 27.6 | 8.1 | 44.3 |

*: J. Redmon et al, YOLOv3: An incremental improvement. CoRR, abs/1804.02767, 2018.

7. Defense Against Transferred Attacks

In one or more experimental settings, the performance of the robust models under transferred attacks was further tested under attacks that were transferred from models with different backbones and/or detection architectures. Embodiments of the presented model under test were based on SSD+VGG16. Attacks transferred from different backbones were generated under the SSD architecture but with the VGG backbone replaced with ResNet or DarkNet. For attacks transferred from different detection architectures, RFB, FSSD, and YOLO were used. In one or more experimental settings, DAG and RAP were used as the underlining attack generation algorithms. The results were summarized in Table 5. It was observed that embodiments of the presented model were robust under transferred attacks generated with different algorithms and architectures. It was also observed that the attacks having a certain level of robustness may be transferred across detectors with different backbones or structures.

TABLE 5

Performance of presented model embodiment (SSD + VGG16) against attacks transferred from different backbones and detector architectures.

| transferred attack | DAG | RAP | average |
| --- | --- | --- | --- |
| SSD + ResNet50 | 49.3 | 49.4 | 49.4 |
| SSD + DarkNet53 | 49.2 | 49.4 | 49.3 |
| RFB + ResNet50 | 49.1 | 49.3 | 49.2 |
| FSSD + DarkNet53 | 49.3 | 49.2 | 49.3 |
| YOLO + DarkNet53 | 49.5 | 49.5 | 49.5 |

8. Results on More Challenging Experiments

In one or more experimental settings, more challenging experiments both for the standard detector as well as the defense were further conducted on one or more datasets with increased number of classes and data variations. The results of different models under RAP attack with attack budget 8 and PGD step 20 were summarized in Table 6. The standard model achieved a very low accuracy in the presence of attack (compared with ~40% on clean images). Embodiments of the presented models improved over the standard model significantly and performs generally well across different backbones and detection architectures. This further demonstrated the effectiveness of embodiments of the presented approach on improving model robustness.

TABLE 6

Comparison of standard and robust models under RAP attack with attack budget 8 and 20 PGD steps.

| model | architecture | backbone | clean | attack |
| --- | --- | --- | --- | --- |
| standard | SSD | VGG16 | 39.8 | 2.8 |
| | SSD | VGG16 | 27.8 | 16.5 |
| Embodiments | SSD | DarkNet53 | 20.9 | 18.8 |
| of the | SSD | ResNet50 | 18.0 | 16.4 |
| presented | RFB | ResNet50 | 24.7 | 21.6 |
| model | FSSD | DarkNet53 | 23.5 | 20.9 |
| | YOLO | DarkNet53 | 24.0 | 21.5 |

F. Some Conclusions

Disclosed herein are embodiments of an approach for improving the robustness object detectors against adversarial attacks. From a multi-task view of object detection, existing attacks for object detectors and the impacts of individual task component on model robustness are systematically analyzed. Embodiment of adversarial training methods for robust object detection are developed based on these analyses. Experimental results have demonstrated the efficacy of embodiment of adversarial training methods on improving model robustness compared with the standard model, across different attacks, datasets, detector backbones and architectures.

This present patent disclosure may serve as an initial step towards adversarially robust detector training with promising results. More efforts may be devoted in this direction to address further challenges. New advances on object detection may be used to further improve the model performance, e.g., better loss function for approximating the true objective and different architectures for addressing small object issues. Similarly, as a component task of object detection, any advances on classification task may be potentially transferred as well. There is also a trade-off between accuracy on clean image and robustness for object detection as in the classification case. Furthermore, by viewing object detection as an instance of multi-task learning task, embodiments of the present patent disclosure may serve as an example on robustness improvement for other multi-task learning problems as well.

G. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
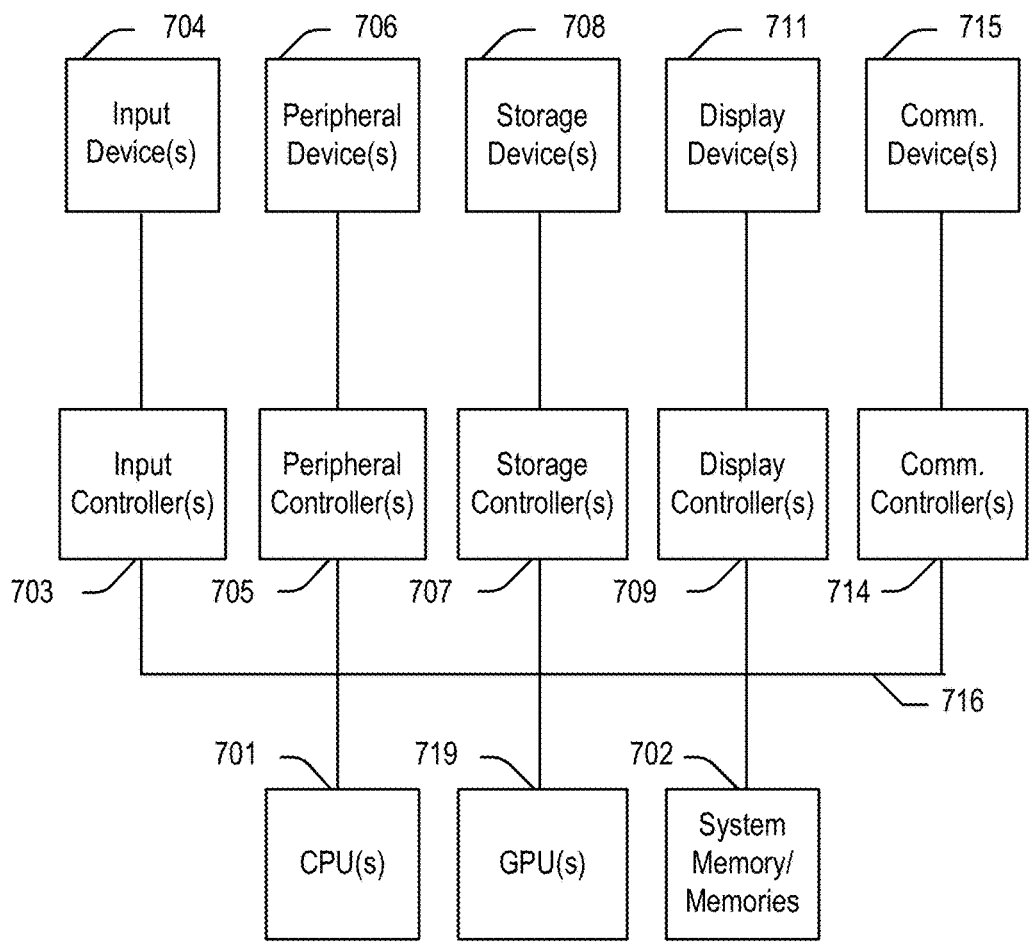
FIG. 7 depicts a simplified block diagram of a computing device/information handling system, in accordance with embodiments of the present disclosure.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method to train an image model for adversarially robust object detection using one or more processors to cause steps to be performed comprising:
    receiving an input image dataset comprises a plurality of input images and an attack budget, each input image comprises one or more objects associated with corresponding ground-truth object labels and bounding boxes;
    for each input image,
        producing an initial adversarial image using one or more attacks within the attack budget;
        computing one or more attacks in a classification task domain using the initial adversarial image and one or more attacks in a localization task domain using the initial adversarial image; and
        obtaining a final attack image based on the computed one or more attacks in the classification task domain and in the localization task domain; and
    performing adversarial training using the obtained final attack images to learn parameters of the image model.

2. The computer-implemented method of claim 1 wherein computing attacks in the classification task domain and in the localization task domain comprises computing image gradients derived from classification loss and localization loss using the initial adversarial image.

3. The computer-implemented method of claim 2 wherein the image gradients derived from classification loss and localization loss are projected, using a projection operator, into a task-agnostic domain.

4. The computer-implemented method of claim 3 wherein the task-agnostic domain is a union of the classification task domain and the localization task domain.

5. The computer-implemented method of claim 1 wherein obtaining the final attack image based on the computed attacks in the classification task domain and in the localization task domain comprises:
    computing a classification task loss using the computed one or more attacks in the classification task domain and the one or more ground-truth object labels and bounding boxes;
    computing a localization task loss using the computed one or more attacks in the localization task domain and the one or more ground-truth object labels and bounding boxes;
    comparing the classification task loss and the localization task loss; and
    using the one or more attacks corresponding to the larger loss between the classification task loss and the localization task loss for the final attack image.

6. The computer-implemented method of claim 1 wherein the one or more attacks for producing the initial adversarial image are white-box attacks.

7. The computer-implemented method of claim 1 wherein the attacks in the classification task domain and in the localization task domain are computed sequentially.

8. The computer-implemented method of claim 1 wherein the attacks in the classification task domain and in the localization task domain are computed in parallel.

9. A computer-implemented method for adversarial image generation to train an image model using one or more processors to cause steps to be performed comprising:
    receiving an input image and an attack budget, the input image comprises one or more objects associated with corresponding ground-truth object labels and bounding boxes;
    producing an initial adversarial image using one or more attacks within the attack budget;
    computing one or more attacks in a classification task domain and a classification task loss using the computed one or more attacks in the classification task domain on the initial adversarial image and the one or more ground-truth object labels and bounding boxes;
    computing one or more attacks in a localization task domain and a localization task loss using the computed one or more attacks in the localization task domain on the initial adversarial image and the one or more ground-truth object labels and bounding boxes; and
    obtaining a final attack image by selecting between the computed one or more attacks in the classification task domain and the computed one or more attacks in the localization task domain based on a comparison between the classification task loss and the localization task loss.

10. The computer-implemented method of claim 9 wherein the one or more attacks corresponding to the larger loss between the classification task loss and the localization task loss are selected for the final attack image.

11. The computer-implemented method of claim 9 wherein computing one or more attacks in the classification task domain and in the localization task domain comprises computing image gradients derived from classification loss and localization loss using the initial adversarial image.

12. The computer-implemented method of claim 11 wherein the image gradients derived from classification loss and localization loss are projected, using a projection operator, into a task-agnostic domain.

13. The computer-implemented method of claim 12 wherein the task-agnostic domain is a union of the classification task domain and the localization task domain.

14. The computer-implemented method of claim 9 wherein the one or more attacks in the classification task domain and in the localization task domain are computed sequentially or in parallel.

15. A non-transitory computer-readable medium or media comprising one or more sequences of instructions which, when executed by one or more processors, causes the steps to be performed comprising:
- receiving an input image dataset comprises a plurality of input images, each input image comprises one or more objects associated with corresponding ground-truth object labels and bounding boxes, and an attack budget;
- selecting a random batch of images from the image dataset;
- for each input image in the random batch:
  - producing an initial adversarial image using one or more attacks within the attack budget;
  - computing one or more attacks in a classification task domain using the initial adversarial image and one or more attacks in a localization task domain using the initial adversarial image; and
  - obtaining a final attack image based on the computed attacks in the classification task domain and in the localization task domain; and
- using the obtained final attack images for each input image for learning parameters of the image model in one or more adversarial training steps.

16. The non-transitory computer-readable medium or media of claim 15 wherein computing one or more attacks in the classification task domain and in the localization task domain comprises computing image gradients derived from classification loss and localization loss using the initial adversarial image.

17. The non-transitory computer-readable medium or media of claim 16 wherein computing one or more attacks in the classification task domain and in the localization task domain further incorporate a sign operator applied to the computed image gradients.

18. The non-transitory computer-readable medium or media of claim 17 wherein the sign applied image gradients derived from classification loss and localization loss are projected, using a projection operator, into a task-agnostic domain.

19. The non-transitory computer-readable medium or media of claim 18 wherein the task-agnostic domain is a union of the classification task domain and the localization task domain.

20. The non-transitory computer-readable medium or media of claim 15 wherein obtaining the final attack image based on the computed attacks in the classification task domain and in the localization task domain comprises:
- computing a classification task loss using the computed one or more attacks in the classification task domain and the one or more ground-truth object labels and bounding boxes;
- computing a localization task loss using the computed one or more attacks in the localization task domain and the one or more ground-truth object labels and bounding boxes;
- comparing the classification task loss and the localization task loss; and
- using the one or more attacks corresponding to the larger loss between the classification task loss and the localization task loss for the final attack image.

* * * * *